(12) United States Patent
Udrea et al.

(10) Patent No.: US 10,436,646 B2
(45) Date of Patent: Oct. 8, 2019

(54) IR DETECTOR ARRAYS

(71) Applicant: AMS Sensors UK Limited, Cambridge (GB)

(72) Inventors: Florin Udrea, Cambridge (GB); Andrea De Luca, Cambridge (GB)

(73) Assignee: AMS Sensors UK Limited, Cambridge (GB)

( * ) Notice: Subject to any disclaimer, the term of this patent is extended or adjusted under 35 U.S.C. 154(b) by 29 days.

(21) Appl. No.: 15/908,159

(22) Filed: Feb. 28, 2018

(65) Prior Publication Data

US 2019/0265106 A1    Aug. 29, 2019

(51) Int. Cl.
*G01J 5/12*     (2006.01)

(52) U.S. Cl.
CPC ............ *G01J 5/12* (2013.01); *G01J 2005/123* (2013.01)

(58) Field of Classification Search
CPC .............................. G01J 5/12; G01J 2005/123
USPC ....................................................... 250/338.1
See application file for complete search history.

(56) References Cited

U.S. PATENT DOCUMENTS

| | | |
|---|---|---|
| 7,842,922 B2 | 11/2010 | Leneke et al. |
| 8,552,380 B1 * | 10/2013 | Florin .................. G01J 5/12 250/338.4 |
| 9,214,604 B2 | 12/2015 | Ali et al. |

OTHER PUBLICATIONS

Kanno, Toshio, et al., Uncooled infrared focal plane array having 128×128 thermopile detector elements, SPIE vol. 2269, Infrared Technology XX, (Oct. 17, 1994); doi: 10.1117/12.188660: SPIE's 1994 International Symposium on Optics, Imaging, and Instrumentation, San Diego, CA; 11 pages.

Graf., A., et al., Review of micromachined thermopiles for infrared detection, Meas. Sci. Technol. 18 (2007) R59-R75, IOP Publishing Ltd, May 9, 2007; 18 pages.

Jones, C.D.W., et al., MEMS thermal imager with optical readout, ScienceDirect, Sensors and Actuators A: Physical; Published by Elsevier B.V. (2009); 11 pages.

Foote, Marc, Jones, Eric, High-performance micromachined thermopile linear arrays, SPIE vol. 3379, Infrared Detectors and Focal Plane Arrays V, (Jul. 22, 1998); doi: 10.1117/12.317587: Aerospace/Defense Sensing and Controls, 1998, Orlando, FL; 7 pages.

De Luca, Andrea, et al., Filterless non-Dispersive Infra-Red Gas Detection a Proof of Concept, MEMS, IEEE (2017), International Conference, Las Vegas, NV, Jan. 22-26, 2017; 4 pages.

De Luca, Andrea, et al., Enhanced spectroscopic gas sensors using in-situ grown carbon nanotubes; Applied Physics Letters vol. 106,194101, AIP Publishing LLC (2015); 6 pages.

(Continued)

*Primary Examiner* — David P Porta
*Assistant Examiner* — Gisselle M Gutierrez
(74) *Attorney, Agent, or Firm* — Tucker Ellis LLP (57) ABSTRACT

We disclose herein an infra-red (IR) detector comprising a substrate comprising at least one etched portion and a substrate portion; a dielectric layer disposed on the substrate. The dielectric layer comprises at least one dielectric membrane, which is adjacent to the etched portion of the substrate. The detector further comprises a first sensing area and a second sensing area each located in a dielectric membrane and a plurality of thermocouples. At least one thermocouple comprises first and second thermal junctions. The first thermal junction is located in or on the first sensing area and the second thermal junction is located in or on the second sensing area.

20 Claims, 5 Drawing Sheets

(56) References Cited

OTHER PUBLICATIONS

Calaza, C., An uncooled infrared focal plane array for low-cost applications fabricated with standard CMOS technology, ScienceDirect, Sensors and Actuators A 132 (2006) 129-138; 10 pages.
Sarro., P.M., et al., An integrated thermal infrared sensing array, Sensors and Actuators, 14 (1988) 191-201; 11 pages.
Hirota, Maski, et al., 120×90 Element thermopile array fabricated with CMOS technology, Proceedings of SPIE vol. 4820 (2003) pp. 239-249; doi: 10.1117/12.457719: International Symposium on Optical Science and Technology, Seattle, WA; 12 pages.

\* cited by examiner

PRIOR ART

Figure 1

PRIOR ART

IR DETECTOR ARRAYS

TECHNICAL FIELD OF THE DISCLOSURE

The disclosure relates to infrared (IR) detectors, particularly but not exclusively, to micro-machined IR detector arrays.

BACKGROUND OF THE DISCLOSURE

Micro-machined thermal infrared (IR) detectors are a well-established technology, and are typically based on thermopiles, bolometers, pyrodetectors or even diodes. These typically include a structure thermally insulated from the substrate (such as a membrane or micro-bridge) which heats up due to incident IR radiation, and this change in temperature is detected using various methods.

A micro-machined infrared (IR) thermopile detector typically comprises a number of thermocouples connected in series with their hot junctions (sensing junctions) embedded within a membrane, or any other thermally isolating structure (e.g. a bridge, a cantilever, etc.), and their cold junctions (reference junctions) located outside the membrane, or any other thermally isolating structure.

Each thermocouple is formed by joining together two dissimilar materials (i.e. thermocouple legs). Additionally an IR thermopile detector comprises two electrical connections (i.e. metallic tracks) connecting the thermopile positive and negative ends to the respective PADs on-chip. As a consequence an IR thermopile detector will be characterised by two outputs and will need a package with at least two leads, or any other means for external connection. In case of an IR thermopile detector array, the number of outputs will be proportional to the number of thermopile detectors forming the array. For the general case of an array comprising N thermopiles, the number of outputs will be 2N.

Having a large number of outputs is not desirable, since it has an effect on:
  i) the number of PADs on-chip, resulting in larger occupied area, and thus higher costs;
  ii) the number of bonding wires, with related costs and possibly arising reliability issues; and
  iii) the number of package leads, or any other means for external connection, with related cost and package size.

Furthermore, in some applications there is no interest in the absolute output from each single IR detector forming the IR detector array, but there is interest in the differential output (i.e. the difference between outputs from different thermopiles).

A number of designs of IR thermopile detectors have been reported.

For example, in A. De Luca, et al., "Filterless non-dispersive infra-red gas detection: A proof of concept," in Micro Electro Mechanical Systems (MEMS), 2017 IEEE 30th International Conference on, 2017, pp. 1220-1223, an array of IR detectors comprising two IR thermopile detectors with tailored optical properties is presented and the quantity of interest is the difference between the two thermopiles' output that is correlated to CO2 concentration.

Graf et al. "Review of micromachined thermopiles for infrared detection" Meas. Sci. Technol. 18 (2007) R59-R75 reviews several thermopile based IR detectors which are typically on a membrane.

Typically the entire thermally isolated area is considered as sensing area, but in some cases the sensing area is defined as the portion of the area of the thermally insulating structure comprising an IR absorbing layer. In A. De Luca, et al., "Enhanced spectroscopic gas sensors using in-situ grown carbon nanotubes," Applied Physics Letters, vol. 106, p. 194101, 2015 the sensing area is the area where carbon nanotubes are grown, and in U.S. Pat. No. 9,214,604B2 by Ali et al. the sensing area is the area where the plasmonic structures are located.

It is also well known how to fabricate arrays of IR detectors. For example, Hirota et al., "120×90 Element thermopile array fabricated with CMOS technology," Proceedings of SPIE Vol. 4820 (2003) pp. 239-249 describes an array of thermopile IR detectors, where each IR detector pixel is a separate front-side etched membrane.

Sarro et al., "An integrated thermal infrared sensing array," Sensors and Actuators 14 (1998) pp. 191-201, describes a linear 8-element thermopile array where each IR detector is on a cantilever structure. Jones et al., "MEMS thermal imager with optical readout", Sensors and actuators A 155 (2009), pp. 47-57, describes a two dimensional array where each detector is on a cantilever.

Foote et al., "High performance micromachined thermopile linear arrays," SPIE Vol. 3379, 1998, pp. 192-197, describes a linear array with each thermopile IR detector on a micro-bridge.

Calaza et al., "An uncooled infrared focal plane array for low-cost applications fabricated with standard CMOS technology," Sensors and Actuators A 132 (2006) pp. 129-138, describes a two dimensional IR detector array, where each detector is on a suspended membrane/microbridge structure.

Kanno et al., "Uncooled infrared focal plane array having 128×128 thermopile detector elements," SPIE Vol. 2269, pp. 450-459 describes a 128×128 IR detector array, where each element is on a suspended membrane/diaphragm. U.S. Pat. No. 7,842,922 describes an IR detector array based on thermopiles, where each element is on membrane.

SUMMARY OF THE DISCLOSURE

There is no report of IR detector arrays comprising at least one thermocouple leg bridging between two different IR sensing areas. Arrangements based upon this approach result in a reduction of outputs and directly provide a differential output.

The disclosure is related to micromachined infrared (IR) detectors, particularly to IR thermopile detector arrays comprising at least one thermocouple arm (or leg) bridging between two different IR sensing areas. This approach allows a reduction in the number of IR thermopile detector array outputs and directly provides a differential output.

The state-of-the art IR detector arrays are based on circuitry to address each single thermopile forming the array and circuital blocks for data elaboration (e.g. differential output extraction). The electronics may be on-chip or external to the chip (e.g. on a separate ASIC, on PCB).

This disclosure proposes to overcome the problems in the state-of-the-art detectors by use of differential thermopile arrangements, whereby a differential output is the quantity of interest.

In this disclosure we propose different thermopiles arrangements to reduce the number of outputs and directly obtain a differential output without the need for circuital blocks. This may be achieved by properly connecting two or more thermopiles to each other, by having at least one thermocouple leg bridging between two different IR sensing areas (or between two membrane areas).

Compared to state-of-the-art IR devices, by providing a differential output the devices disclosed here will have the following advantages:

i) A reduction in chip area, by reducing the number of thermopile outputs and thus reducing the number of connection pads
ii) A reduction in costs, associated with the chip area and the assembly and packaging of chips with a reduced number of outputs
iii) A reduction in system complexity, since the IR detector array can directly provide a differential output(s) without any additional circuital blocks
iv) Depending upon the design, further benefits in terms of sensitivity/noise trade-off can be achieved.

According to one aspect of the present disclosure, there is provided an infra-red (IR) detector comprising: a substrate comprising at least one etched portion and a substrate portion; a dielectric layer disposed on the substrate, wherein the dielectric layer comprises at least one dielectric membrane, and wherein the at least one dielectric membrane is adjacent to the etched portion of the substrate, a first sensing area and a second sensing area each located in a dielectric membrane; and a plurality of thermocouples, wherein at least one thermocouple comprises first and second thermal junctions, and wherein the first thermal junction is located in or on the first sensing area and the second thermal junction is located in or on the second sensing area.

This has the advantage of providing a differential output as both thermal junctions are used for sensing. The thermocouple with both junctions located within sensing areas may be considered to have no cold junctions located outside the sensing areas, but rather have a hot junction located in one sensing area and a relatively less hot junction located in a second sensing area.

The dielectric membrane may be thermally isolated from the substrate by etching. The membrane may be formed by back-etching using Deep Reactive Ion Etching (DRIE) of the substrate, which results in vertical sidewalls. The back-etching can also be performed using anisotropic etching such as KOH (Potassium Hydroxide) or TMAH (Tetra Methyl Ammonium Hydroxide) which result in slopping sidewalls. The membrane can also be formed by a front-side etch to result in a suspended membrane structure, supported by at least two or more beams.

The dielectric membrane area may be the area of the membrane which is directly on top of the etched portion of the substrate.

The at least one thermocouple may comprise a first arm (or leg) of a first material and a second arm (or leg) of a second material, wherein the first material and the second material are dissimilar materials.

The thermocouple materials may include metal such as Al, Copper, Tungsten, Titanium or combination of those, doped polysilicon (n or p type) or doped single crystal silicon (n or p type). If both the materials are polysilicon and/or single crystal silicon, a metal link may be used to form the junctions between the thermocouple materials.

At least one arm may extend between the first sensing area and the second sensing area. This allows both thermal junctions of the thermocouple to be formed within sensing areas. Advantageously, this directly provides a differential output.

At least one arm may form a bridge between the first sensing area and the second sensing area. This allows both thermal junctions of the thermocouple to be formed within sensing areas. Advantageously, this directly provides a differential output.

The at least one thermocouple located both in the first and second sensing areas may provide an output which is directly proportional to a difference between an IR radiation sensed in the first sensing area and an IR radiation sensed in the second sensing area. This reduces the number of thermopile outputs. Advantageously this provides a reduction in chip area, number of connection pads, costs, and system complexity.

Preferably, at least one arm may comprise a metal portion linking both side portions of the arm. In other words, part of the thermocouple arm may be replaced with a metal connection. The metal portion may be connected to two side portions both comprising same material as each other. The metal portion reduces the resistance of the arm and the overall resistance of the thermopile.

The first sensing area and the second sensing area may be each located in a separate dielectric membrane. This thermally isolates the two sensing areas from one another.

Optionally, the infra-red detector may further comprise a further thermocouple having a thermal junction located outside the dielectric membrane. In other words, the infrared detector may comprise at least two thermocouples, with hot thermal junctions located in separate sensing areas, connected together. Two thermopiles may be connected by a thermocouple arm (or leg) between the two different sensing areas, wherein each thermopile comprises thermocouples with hot junctions within a sensing area and at least one thermocouple with a cold junction outside a sensing area.

The first sensing area and the second sensing area may be each located in a single dielectric membrane. In other words, both sensing areas may be located within the same dielectric membrane. There may be no substrate portion located below the portion of the dielectric membrane between the two sensing areas. This results in smaller chip size and lower cost.

Optionally, the infra-red detector may further comprise a thermal bridge between the first and second sensing areas within the single dielectric membrane. The thermal bridge thermally isolates two sensing areas within a single dielectric membrane from one another. The thermal bridge may be more thermally conductive than the membrane. The thermal bridge may act as a heat sink. The thermal bridge may be configured such that it does not have direct contact to the substrate.

The first thermal junction may be thermally isolated from the second thermal junction, and the first thermal junction may be thermally isolated from the substrate, and the second thermal junction may be thermally isolated from the substrate.

The first thermal junction and the second thermal junction may be thermally isolated from the substrate.

Preferably, the first sensing area and the second sensing area may have different IR sensing properties.

The infra-red detector may further comprise an infra-red sensing layer above one of the first sensing area and the second sensing area. The infra-red sensing layer may comprise a plasmonic layer.

The infra-red sensing layer may comprise at least one plasmonic structure. The plasmonic layer or at least one plasmonic structure may be configured to tailor (optimise) the optical properties of the IR detector below it.

Advantageously, the plasmonic structures or layer may improve the absorbance at preferred wavelengths or filter out specific unwanted wavelengths or bands of wavelengths. The plasmonic structures may be made of metal such as tungsten, aluminium, copper, titanium, molybdenum, gold or platinum, silicides or polysilicon or single crystal silicon, and may be periodically repeated in a lateral direction. The structures may be circle, ellipse, rectangular, trapezoid, or any other shape or combination of different shapes. The structures may be dots of these shapes or holes of these shapes within the layer. The repeat pattern may be hexagonal or square. The structures may be in more than one layer.

Optionally, the plurality of thermocouples may be connected to form a single thermopile. Some or all of the plurality of the thermocouples may comprise one or two thermocouple arms extending between the first sensing area and the second sensing area. Each thermocouples extending between the first sensing area and the second sensing area directly provides a differential output.

Each end of the thermopile may be connected to a circuit using a Through Silicon Via (TSV).

The infra-red detector may further comprise a metal connection between the plurality of thermocouples.

According to a further aspect of the disclosure, there is also provided an infra-red detector array device comprising a two dimensional array of a plurality of IR detectors as described above.

According to a further aspect of the disclosure, there is also provided a method of manufacturing an infra-red detector, the method comprising:
 forming a substrate comprising at least one etched portion and a substrate portion;
 forming a dielectric layer disposed on the substrate, wherein the dielectric layer comprises at least one dielectric membrane, and wherein the at least one dielectric membrane is adjacent to the etched portion of the substrate,
 forming a first sensing area and a second sensing area each in a dielectric membrane; and
 forming a plurality of thermocouples, wherein at least one thermocouple comprises first and second thermal junctions, and wherein the first thermal junction is located in or on the first sensing area and the second thermal junction is located in or on the second sensing area.

BRIEF DESCRIPTION OF THE PREFERRED EMBODIMENTS

Some preferred embodiments of the disclosure will now be described by way of example only and with reference to the accompanying drawings, in which.

DETAILED DESCRIPTION OF THE PREFERRED EMBODIMENTS

Generally speaking, the disclosure relates to micro-machined Infra-Red (IR) detectors, including at least one thermocouple leg bridging between two different IR sensing areas. This approach allows a reduction in the number of IR thermopile detector array outputs and directly provides a differential output.

Some examples of the device are given in the accompanying figures.

Figure 1:
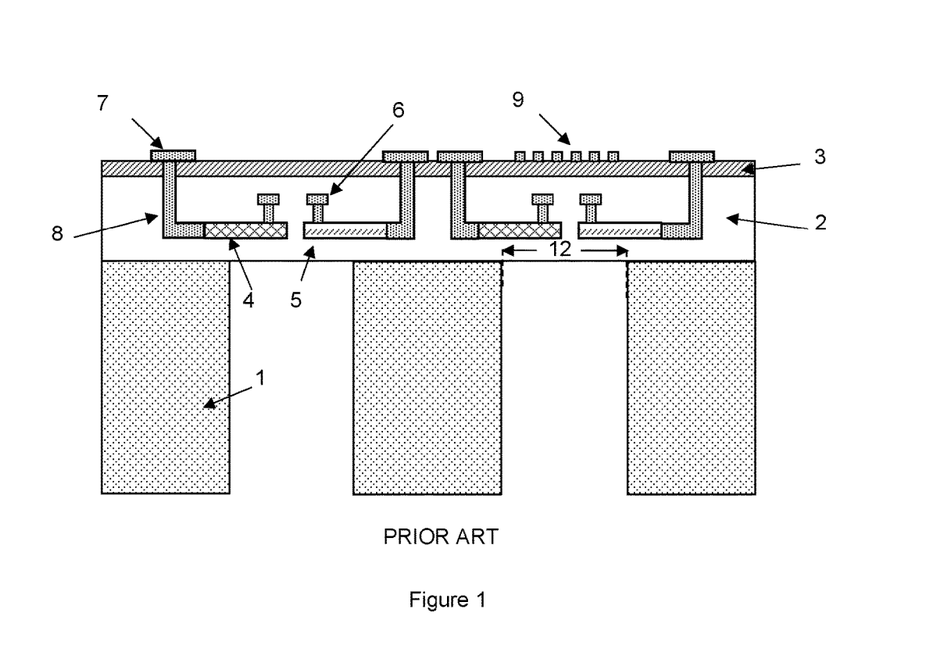
FIG. 1 shows a cross section of a conventional (state of the art) IR thermopile detector (1×2) array, in which each IR thermopile detector has tailored optical properties.

FIG. 1 shows a cross section of a conventional (state of the art) IR thermopile detector (1×2) array, wherein each IR thermopile detector has tailored optical properties. The infra-red (IR) detector array comprises two dielectric membranes supported by a semiconductor substrate 1 which has two etched portions. An array of IR thermopile detectors comprising two IR thermopile detectors are formed within the dielectric layer 2, wherein each IR thermopile detector is formed on or within one dielectric membrane 12. A passivation layer 3 is formed on top of the dielectric layer 2. Each thermopile comprises several thermocouples, each having the hot junctions embedded within the membrane (sensing) area 12 and the cold junction embedded outside the membrane area 12. Each thermocouple is formed by connecting two dissimilar materials 4 and 5. The materials can be p-type or n-type polysilicon or crystalline silicon, and connected together by a metal 6. Alternatively, the thermopile material can also be a metal such as aluminium, tungsten, copper, or titanium. Each thermopile end is connected to a PAD 7 via a metal connection 8. Alternatively each thermopile end may be connected to a PAD at the bottom of the substrate 1 via a Through Silicon Via (TSV) (not shown here). An IR sensing layer may also be present and defines an IR sensing area smaller than the entire membrane area. The IR sensing layer may also be in form of a plasmonic layer 9 (i.e. a spatially periodic arrangement of structures) configured to tailor the optical properties of the IR thermopile detector below it. The plasmonic layer 9 may also be within or below the membrane.

Figure 2:
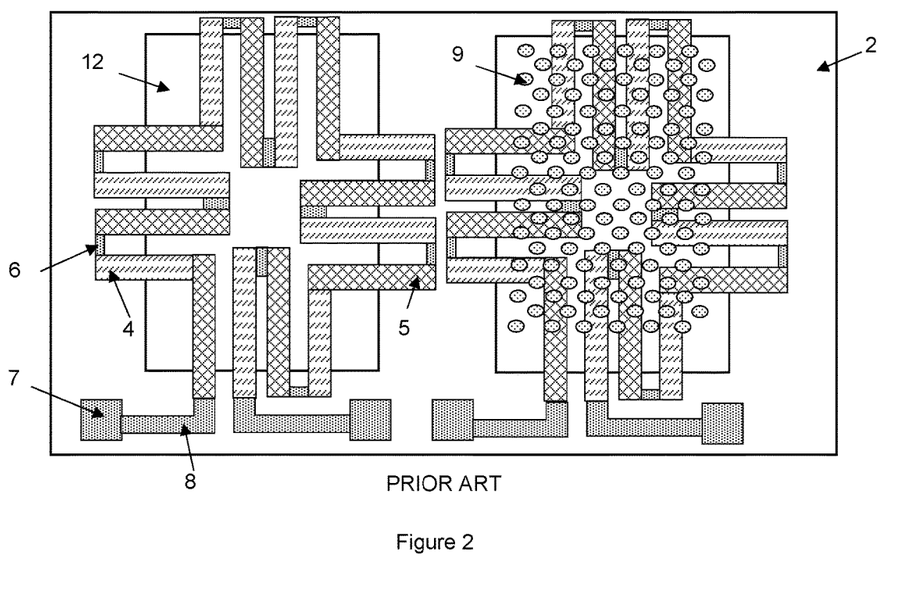
FIG. 2 shows a top view of a conventional (state of the art) IR thermopile detector (1×2) array, in which each IR thermopile detector has tailored optical properties.

FIG. 2 shows a top view of a conventional (state of the art) IR thermopile detector (1×2) array, wherein each IR thermopile detector has tailored optical properties. Many features of the device of FIG. 2 are the same as those in FIG. 1, and therefore carry the same reference numerals. The infra-red (IR) detector array comprises a dielectric layer 2 supported by a semiconductor substrate (not shown in the top view) which has two etched portions. An array of IR thermopile detectors comprising two IR thermopile detectors are formed within the dielectric membrane area 12, wherein each IR thermopile detector is formed on or within one dielectric membrane area 12. Each thermopile comprises several thermocouples, having the hot junctions embedded within the membrane (sensing) area 12 and the cold junction embedded outside the membrane area. Each thermocouple is formed by connecting two dissimilar materials 4 and 5. The materials can be p-type or n-type polysilicon or crystalline silicon, and connected together by a metal 6. Alternatively, the thermopile material can also be a metal such as aluminium, tungsten, copper, or titanium. Each thermopile end is connected to a PAD 7 via a metal connection 8. Alternatively each thermopile end may be connected to a PAD at the bottom of the substrate via a Through Silicon Via (TSV). An IR sensing layer is also present and defines an IR sensing area smaller than the entire membrane area 12. The IR sensing layer can also be in form of a plasmonic layer 9 (i.e. a spatially periodic arrangement of structures) configured to tailor the optical properties of the IR thermopile detector below it. The plasmonic 9 layer may also be within or below the membrane 12.

Figure 3:
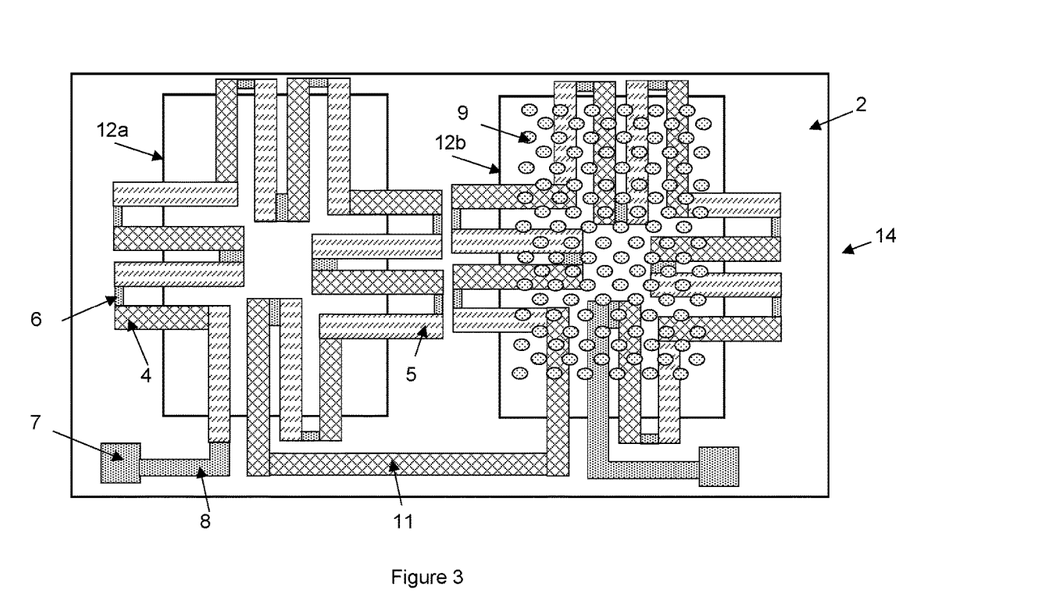
FIG. 3 shows a top view of an exemplary IR thermopile detector (1×2) array, in which the two thermopiles are joined together using a thermocouple leg bridging between two different sensing areas (or membrane areas)

FIG. 3 shows a top view of an exemplary IR thermopile detector (1×2) array according to one embodiment of the present disclosure. The infra-red (IR) detector array 14 comprises a dielectric layer 2 supported by a semiconductor substrate (not shown in the top view) which has two etched cavity portions. It will be understood that the dielectric layer has two dielectric membrane regions 12a, 12b. Generally speaking, one dielectric membrane region 12a, 12b is located immediately adjacent to the etched portion of the substrate. The dielectric membrane region 12a, 12b corresponds to the area above the cavity of the substrate. The definition of the membrane region 12a, 12b as shown in FIG. 3 is applicable in the remaining embodiments and figures described below.

An array of two IR thermopile detectors is formed within the dielectric layer 2, wherein each IR thermopile detector is formed on or within one dielectric membrane 12a, 12b. In this embodiment, the rectangle areas 12a, 12b each are a dielectric membrane area formed within the dielectric layer 2. Each thermopile is formed of several thermocouples. Each thermocouple is formed by connecting two dissimilar materials 4 and 5. The materials can be p-type or n-type polysilicon or crystalline silicon, and connected together by a metal 6. Alternatively, the thermopile material can also be a metal such as aluminium, tungsten, copper, or titanium.

The two thermopiles are interconnected by a thermocouple arm 11 bridging between the two different sensing areas (or membrane areas 12a, 12b) to form a single thermopile. The portion of the thermopile over the first sensing (membrane) area 12a has the hot junctions within the first sensing area (first membrane area 12a) and the cold junctions outside the first membrane area 12a, and the portion of the thermopile over the second sensing (membrane) area 12b also has the cold junctions outside the second membrane area 12b and the hot junctions within the second membrane (sensing) area 12b. However, a thermocouple arm 11 extends between the two sensing areas. This thermocouple has a first thermal junction within the first sensing area 12a and a second thermal junction within the second sensing area 12b. This thermocouple does not have either of the two thermal junctions located outside the dielectric membrane areas.

The remaining two ends of the thermopiles are connected to a PAD 7 via a metal connection 8. The PADs may be at the bottom of the substrate 1 and accessed by the thermopiles via Through Silicon Vias (TSVs).

The thermocouples within each sensing area have tailored optical properties. The two thermopiles joined as shown to form a single thermopile directly provide a differential output. The IR sensing layer is in form of a plasmonic layer 9 (i.e. a spatially periodic arrangement of structures) configured to tailor the optical properties of the IR thermopile detector below it. The plasmonic layer may also be within or below the membrane 12.

Figure 4:
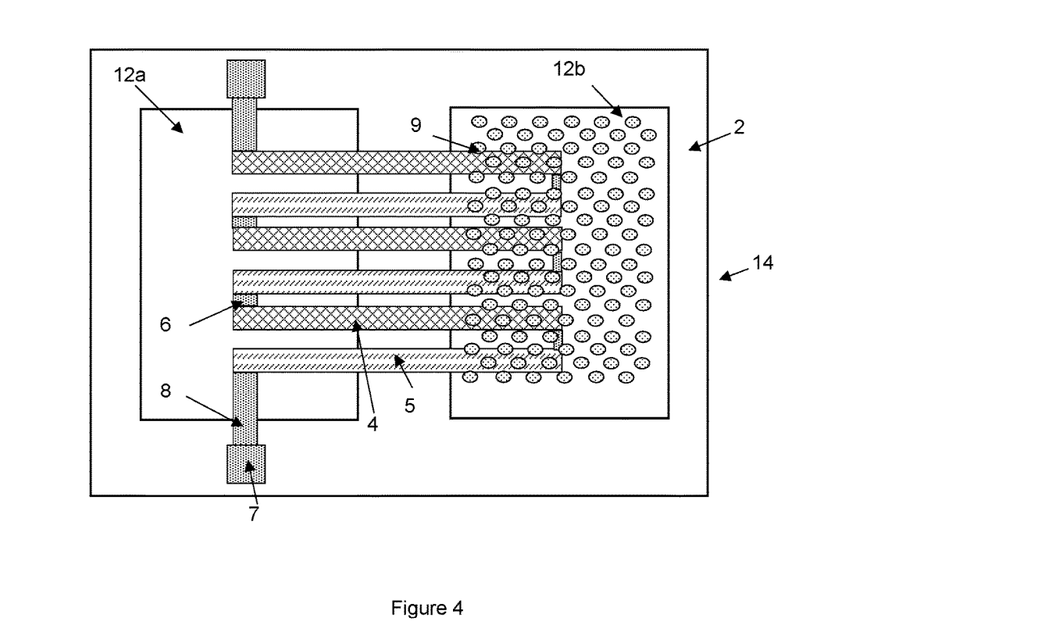
FIG. 4 shows a top view of an IR thermopile detector (1×2) array, in which each thermocouple has both junctions thermally isolated from the substrate.

FIG. 4 shows a top view of an alternative IR thermopile detector (1×2) array in which each thermocouple has both junctions thermally isolated from the substrate. Many features of the detector 14 of FIG. 4 are the same as those in FIG. 3, and therefore carry the same reference numerals. An array of thermocouples is formed within the dielectric layer, wherein the array of thermocouples bridges between the two different membrane (sensing) areas 12a, 12b to form a single thermopile. In this embodiment, each thermocouple leg (or arm) 4, 5 bridges between the two dielectric membrane areas 12a, 12b and has both junctions thermally isolated from the substrate 1. Each thermocouple is formed by connecting two dissimilar materials 4 and 5. The materials can be p-type or n-type polysilicon or crystalline silicon, and connected together by a metal 6. Alternatively, the thermopile material can also be a metal such as aluminium, tungsten, copper, or titanium. The two ends of the thermopile are connected to PADs 7 via metal connections 8. The PADs may be at the bottom of the substrate 1 and accessed by the thermopiles via Through Silicon Vias (TSVs) (not shown here).

Thermal junctions of a first type of the thermopile are formed within one dielectric membrane area 12a and the thermal junctions of a second type are formed within the other dielectric membrane area 12b. In this embodiment, there are no thermal junctions on the substrate. The sensing areas have tailored optical properties. The thermopile directly provides a differential output. The IR sensing layer is in form of a plasmonic layer 9 (i.e. a spatially periodic arrangement of structures) configured to tailor the optical properties of the IR detector below it. The plasmonic layer 9 is also within or below the second membrane area 12b.

Figure 5:
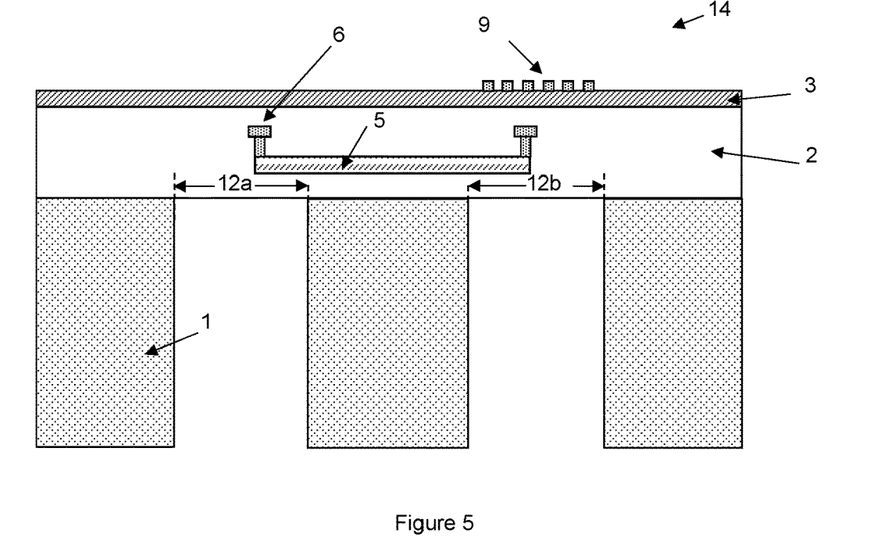
FIG. 5 shows a cross section of an IR thermopile detector (1×2) array, in which each thermocouple has both junctions thermally isolated from the substrate.

FIG. 5 shows a cross section of an IR thermopile detector (1×2) array, in which each thermocouple has both junctions thermally isolated from the substrate. Many of the features of the detector 14 of FIG. 5 are the same as those in FIG. 3, and therefore carry the same reference numerals. Similarly to FIG. 4, an array of thermocouples is formed within the dielectric layer 2, so that the array of thermocouples bridges between the two different sensing areas 12a, 12b to form a single thermopile. In this embodiment, each thermocouple leg (or arm) 4, 5 bridges between the two dielectric membrane areas 12a, 12b and has both junctions thermally isolated from the substrate 1. Each thermocouple is formed by connecting two dissimilar materials 4 and 5. The materials can be p-type or n-type polysilicon or crystalline silicon, and connected together by a metal 6. Alternatively, the thermopile material can also be a metal such as aluminium, tungsten, copper, or titanium. The two ends of the thermopile are connected to PADs via metal connections (for simplicity not shown in the figure). The PADs may be at the bottom of the substrate 1 and accessed by the thermopiles via Through Silicon Vias (TSVs). The thermopile directly provides a differential output. The IR sensing layer is in form of a plasmonic layer 9 (i.e. a spatially periodic arrangement of structures) configured to tailor the optical properties of the sensing area below it. The plasmonic layer 9 is also within or below the membrane 12b. In this embodiment, the IR thermopile detector array comprises one thermopile having all thermocouple legs bridging between two different sensing (membrane) areas 12a, 12b and thus directly providing a differential output.

Figure 6:
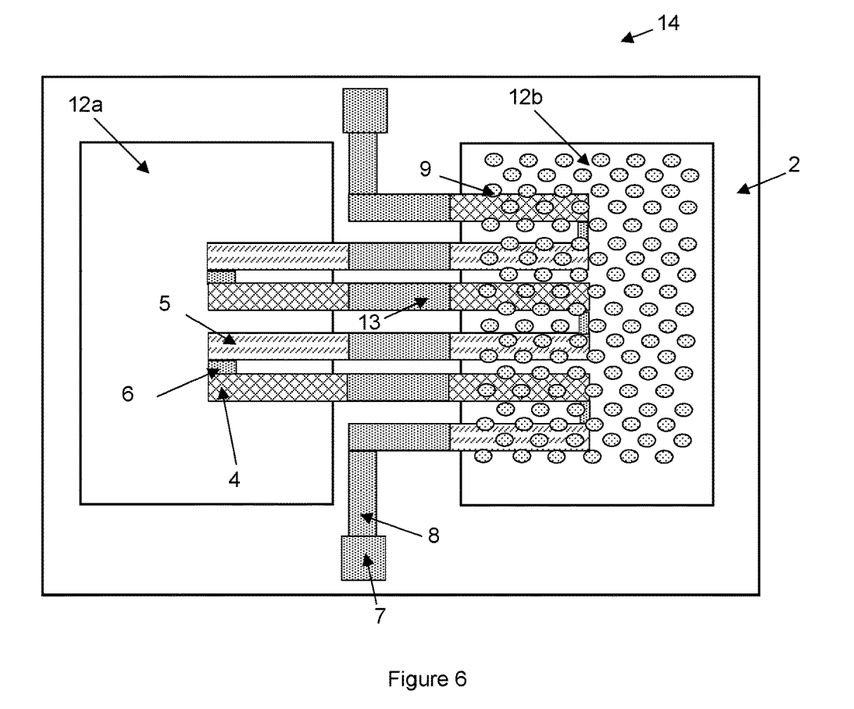
FIG. 6 shows a top view of an IR thermopile detector (1×2) array, in which further metal connections are used to join thermocouples.

FIG. 6 shows a top view of an alternative IR thermopile detector (1×2) array, in which further metal connections are formed between thermocouples. Many of the features of the detector 14 of FIG. 6 are the same as those in FIG. 3, and therefore carry the same reference numerals. An array of thermocouples is formed within the dielectric layer 2, so that the array of thermocouples bridges between the two different sensing areas 12a, 12b to form a single thermopile. Each thermocouple has both junctions thermally isolated from the substrate (not shown here).

In this embodiment, further metal connections 13 are also used to join the different thermocouples with the purpose of reducing the overall resistance, and thus noise, associated with the thermopile. Generally speaking, the IR thermopile detector array of FIG. 6 comprises one thermopile having all thermocouple legs bridging between two different sensing areas 12a, 12b, and thus directly providing a differential output, whereby part of the thermocouples legs is replaced with a metal link to reduce the overall resistance of the thermopile.

Figure 7:
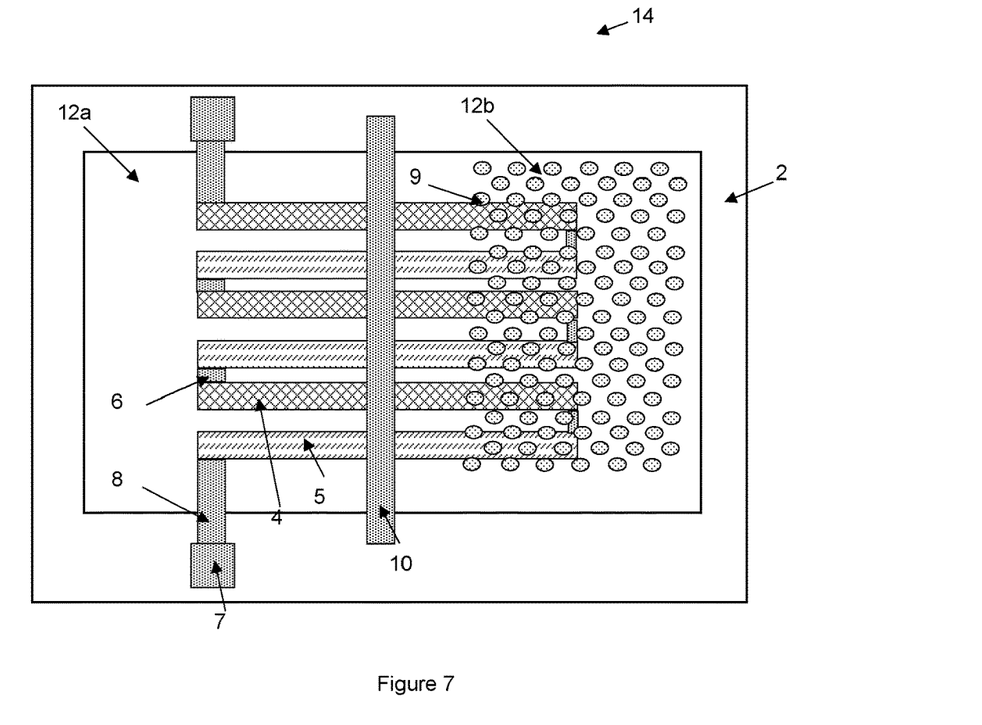
FIG. 7 shows a top view of an IR thermopile detector (1×2) array, in which the two sensing areas are thermally isolated from each other by means of a thermal bridge.

FIG. 7 shows a top view of an alternative IR thermopile detector (1×2) array, in which the two sensing areas are thermally isolated from each other by means of a thermal bridge. Many of the features of the detector 14 of FIG. 7 are the same as those in FIG. 3, and therefore carry the same reference numerals. However, both sensing areas 12a, 12b are located within a single dielectric membrane. In other words, there is only one etched portion in the substrate and one dielectric membrane area is formed and both sensing areas 12a, 12b are located within the single dielectric membrane. An array of thermocouples is formed within the dielectric layer so that the array of thermocouples bridges between the two different sensing areas 12a, 12b and forms a single thermopile.

In this embodiment, the two sensing (membrane) areas 12a, 12b are thermally isolated from each other by means of a thermal bridge 10. The two sensing (membrane) areas 12a, 12b are both formed within the same dielectric membrane area. The thermal bridge 10 is generally formed using one or more layers of metal, silicon, polysilicon. In other words, each thermocouple has both junctions thermally isolated from the substrate 1 and from each other. The two sensing areas 12a, 12b are separated by the thermal bridge 10 embedded within the membrane, which acts as a heat sink. The thermal bridge 10 allows isolation between each sensing area 12a, 12b. Broadly speaking, the IR thermopile detector array of FIG. 7 comprises one thermopile having all thermocouple legs bridging between two different sensing areas 12a, 12b of the same dielectric membrane and thus directly providing a differential output.

Figure 8:
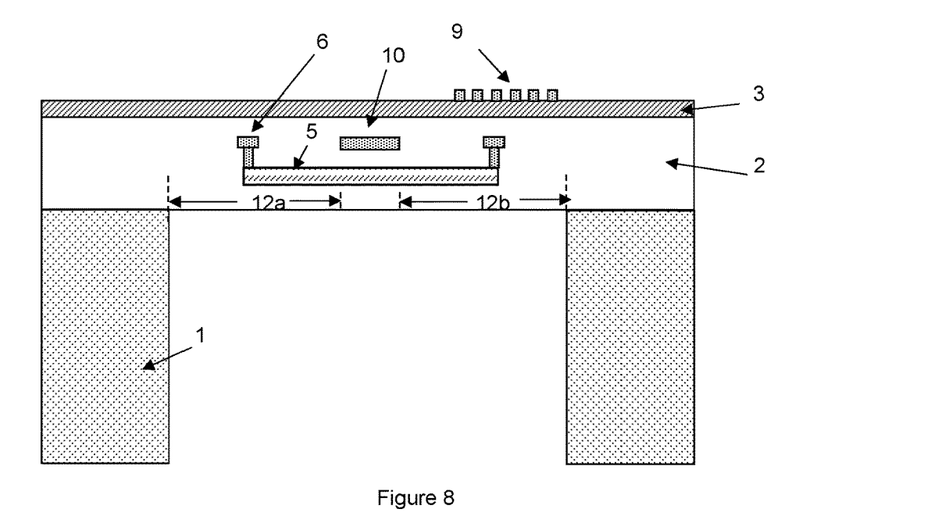
FIG. 8 shows a cross section of an IR thermopile detector (1×2) array, in which the two sensing areas are thermally isolated from each other by means of a thermal bridge.

FIG. 8 shows a cross section of an IR thermopile detector (1×2) array, in which the two sensing areas are thermally isolated from each other by means of a thermal bridge. Many of the features of the detector 14 of FIG. 8 are the same as those in FIG. 3, and therefore carry the same reference numerals. Similarly to FIG. 7, an array of thermocouples is formed within the dielectric layer so that the array of thermocouples bridges between the two different sensing areas 12a, 12b and forms a single thermopile.

In this embodiment, the two sensing (membrane) areas 12a, 12b are thermally isolated from each other by means of a thermal bridge 10. The two sensing areas 12a, 12b may both be formed within the same dielectric membrane area. The thermal bridge 10 may be formed using one or more layers of metal, silicon, polysilicon. In other words, each thermocouple has both junctions thermally isolated from the substrate 1 and from each other. The IR thermopile detector array of FIG. 8 comprises one thermopile having all thermocouple legs bridging between two different sensing areas 12a, 12b of the same membrane and thus directly providing a differential output.

It will be appreciated that the device is not limited to (1×2) arrays, and can be extended to IR detector arrays comprising more than two membranes or sensing areas.

Figure 9:
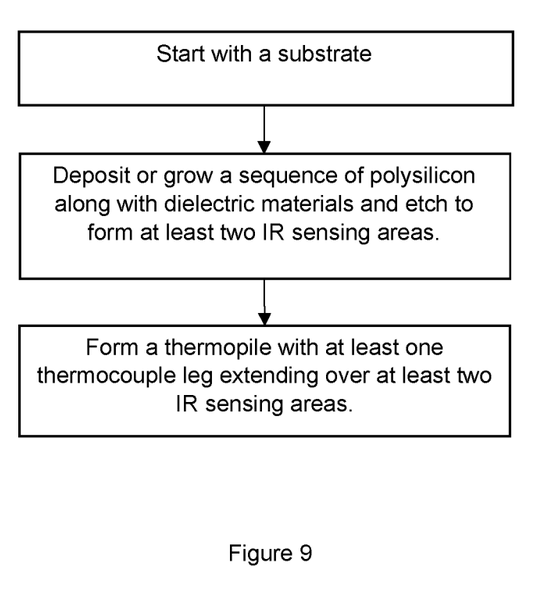
FIG. 9 illustrates an exemplary flow diagram outlining the manufacturing method of the IR detector.

FIG. 9 illustrates an exemplary flow diagram outlining the manufacturing method of the IR detector.

LIST OF REFERENCE NUMERALS 1. semiconductor substrate
2. dielectric layer
3. passivation layer
4. first thermocouple material
5. second thermocouple material
6. connecting metal
7. PAD
8. metal connection
9. plasmonic layer
10. thermal bridge
11. thermocouple leg
12. dielectric membrane area/sensing area
12a. first sensing area
12b. second sensing area
13. metal connections
14. IR detector The skilled person will understand that in the preceding description and appended claims, positional terms such as 'above', 'overlap', 'under', 'lateral', etc. are made with reference to conceptual illustrations of an apparatus, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. An infra-red (IR) detector comprising:
   a substrate comprising at least one etched portion and a substrate portion;
   a dielectric layer disposed on the substrate, wherein the dielectric layer comprises at least one dielectric membrane, and wherein the at least one dielectric membrane is adjacent to the etched portion of the substrate,
   a first sensing area and a second sensing area each located in the at least one dielectric membrane; and
   a plurality of thermocouples, wherein at least one thermocouple comprises first and second thermal junctions, and wherein the first thermal junction is located in or on the first sensing area and the second thermal junction is located in or on the second sensing area.

2. An infra-red detector according to claim 1, wherein the at least one thermocouple comprises a first arm of a first material and a second arm of a second material, wherein the first material and the second material are dissimilar materials.

3. An infra-red detector according to claim 2, wherein at least one arm extends between the first sensing area and the second sensing area.

4. An infra-red detector according to claim 2, wherein at least one arm forms a bridge between the first sensing area and the second sensing area.

5. An infra-red detector according to claim 1, wherein the at least one thermocouple located both in the first and second sensing areas provides an output which is directly proportional to a difference between an IR radiation sensed in the first sensing area and an IR radiation sensed in the second sensing area.

6. An infra-red detector according to claim 2, wherein the at least one arm comprises a metal portion linking both side portions of the at least one arm.

7. An infra-red detector according to claim 1, wherein the first sensing area and the second sensing area are each located in a separate dielectric membrane.

8. An infra-red detector according to claim 7, further comprising a further thermocouple having a thermal junction located outside the dielectric membrane.

9. An infra-red detector according to claim 1, wherein the first sensing area and the second sensing area are each located in a single dielectric membrane.

10. An infra-red detector according to claim 9, further comprising a thermal bridge between said first and second sensing areas within the single dielectric membrane.

11. An infra-red detector according to claim 10, wherein the first thermal junction is thermally isolated from the second thermal junction, and
   wherein the first thermal junction is thermally isolated from the substrate, and
   wherein the second thermal junction is thermally isolated from the substrate.

12. An infra-red detector according to claim 1, wherein the first thermal junction and the second thermal junction are thermally isolated from the substrate.

13. An infra-red detector according to claim 1, wherein the first sensing area and second sensing area have different IR sensing properties.

14. An infra-red detector according to claim 1, further comprising an infra-red sensing layer above one of the first sensing area and the second sensing area.

15. An infra-red detector according to claim 14, wherein the infra-red sensing layer comprises at least one plasmonic structure.

16. An infra-red detector according to claim 1, wherein said plurality of thermocouples are connected to form a single thermopile.

17. An infra-red detector according to claim 16, wherein each end of said thermopile is connected to a circuit using a Through Silicon Via (TSV).

18. An infra-red detector according to claim 16, further comprising a metal connection between said plurality of thermocouples.

19. An infra-red detector array device comprising a two dimensional array of a plurality of IR detectors according to claim 1.

20. A method of manufacturing an infra-red detector, the method comprising:
   forming a substrate comprising at least one etched portion and a substrate portion;
   forming a dielectric layer disposed on the substrate, wherein the dielectric layer comprises at least one dielectric membrane, and wherein the at least one dielectric membrane is adjacent to the etched portion of the substrate,
   forming a first sensing area and a second sensing area each in the at least one dielectric membrane; and
   forming a plurality of thermocouples, wherein at least one thermocouple comprises first and second thermal junctions, and wherein the first thermal junction is located in or on the first sensing area and the second thermal junction is located in or on the second sensing area.

* * * * *